United States Patent
Barton et al.

(10) Patent No.: US 6,401,290 B1
(45) Date of Patent: *Jun. 11, 2002

(54) PAINT BRUSH WITH IMPROVED GRIP CONSTRUCTION

(75) Inventors: William W. Barton, Greendale; Anthony W. Gilbert; Paul H. Mylander, both of New Berlin; Bruce C. Polzin, Greendale; Robert A. Shaffer, Kenosha; James J. Jarecki, deceased, late of Greendale, all of WI (US), by Eileen J. Jarecki, executor

(73) Assignee: Newell Operating Company, Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,206

(22) Filed: Aug. 7, 2000

Related U.S. Application Data

(63) Continuation of application No. 08/841,271, filed on Apr. 29, 1997, now Pat. No. 6,138,313, which is a continuation of application No. 08/513,273, filed on Aug. 10, 1995, now abandoned.

(51) Int. Cl.[7] ................................. A46B 5/02
(52) U.S. Cl. .................. 15/143.1; 15/159.1; 16/430; D4/135
(58) Field of Search .............. 15/143.1, 159.1, 15/160, 191.1, 192, 193; 16/430, 431, 436, DIG. 12, DIG. 18, DIG. 19; 81/489; D4/132, 135, 138

(56) References Cited

U.S. PATENT DOCUMENTS

| | | | | |
|---|---|---|---|---|
| 412,479 A | * | 10/1889 | Davis | 15/143.1 X |
| 673,506 A | * | 5/1901 | Pitts | 15/143.1 X |
| 1,687,335 A | * | 10/1928 | Jackline | 15/143.1 X |
| 2,236,034 A | * | 3/1941 | Luce et al. | 15/143.1 X |
| 2,237,969 A | * | 4/1941 | Olsen | 15/143.1 |
| 2,263,885 A | * | 11/1941 | McGauley | 15/143.1 |
| 2,304,319 A | * | 12/1942 | Saltzman | 15/143.1 X |
| 2,426,315 A | * | 8/1947 | Marick | 15/159.1 |
| 2,664,582 A | * | 1/1954 | Kammann | 15/143.1 |
| 3,023,439 A | * | 3/1962 | Danley | 15/143.1 |
| 3,067,446 A | * | 12/1962 | McGauley | 15/143.1 |
| 3,153,801 A | * | 10/1964 | Weiss et al. | 15/143.1 X |
| 3,819,779 A | * | 6/1974 | Pharris et al. | 15/143.1 X |
| 4,495,669 A | * | 1/1985 | Hooper | 15/143.1 |

(List continued on next page.)

FOREIGN PATENT DOCUMENTS

| | | | | |
|---|---|---|---|---|
| BE | 514702 | * | 7/1954 | |
| DE | 2735542 | * | 2/1979 | |
| DE | 4229152 | * | 3/1994 | |
| GB | 351858 | * | 7/1931 | 15/143.1 |
| GB | 844124 | * | 6/1960 | 15/143.1 |
| GB | 2050156 | * | 1/1981 | 15/143.1 |
| JP | 3-136775 | * | 6/1991 | |
| JP | 6-14846 | * | 4/1994 | |
| JP | 6-60473 | * | 8/1994 | |
| JP | 6-226193 | * | 8/1994 | |
| JP | 6-71082 | * | 10/1994 | |
| JP | 6-85778 | * | 12/1994 | |
| WO | 93/16848 | * | 9/1993 | |

*Primary Examiner*—Mark Spisich
(74) *Attorney, Agent, or Firm*—Foley & Lardner

(57) ABSTRACT

A brush handle is disclosed having a core member which is surrounded by a layer of compressible and resilient gripping material of a non-slip nature, the layer of gripping material closely conforming to the contour of the brush handle and being mechanically interlocked to the handle by at least one projection which is integral with the core member and extend into the layer of gripping material, and also at least partially bonded one to the other by heat and or chemical processes. A brush having the above described handle sealingly secured to a brush head utilizing the layer of gripping material and a method of manufacturing a brush handle are also disclosed.

74 Claims, 2 Drawing Sheets

U.S. PATENT DOCUMENTS

| | | | |
|---|---|---|---|
| D292,348 S | * | 10/1987 | Roberts et al. .......... D4/132 X |
| 4,751,762 A | * | 6/1988 | Meimeteas ............. 15/143.1 X |
| 4,847,939 A | * | 7/1989 | Derencsenyi et al. .. 15/143.1 X |
| D333,217 S | * | 2/1993 | Gingras ....................... D4/135 |
| 5,339,482 A | * | 8/1994 | Desimone et al. ..... 15/143.1 X |
| 5,446,941 A | * | 9/1995 | Kelsay .................. 15/143.1 X |
| 5,465,449 A | * | 11/1995 | Lewkoxicz ............ 15/143.1 X |
| 5,615,445 A | * | 4/1997 | Kelsay et al. .......... 15/143.1 X |
| 5,761,759 A | * | 6/1998 | Leversby et al. ...... 15/143.1 X |
| 5,920,943 A | * | 7/1999 | Barker ..................... 15/143.1 |

* cited by examiner

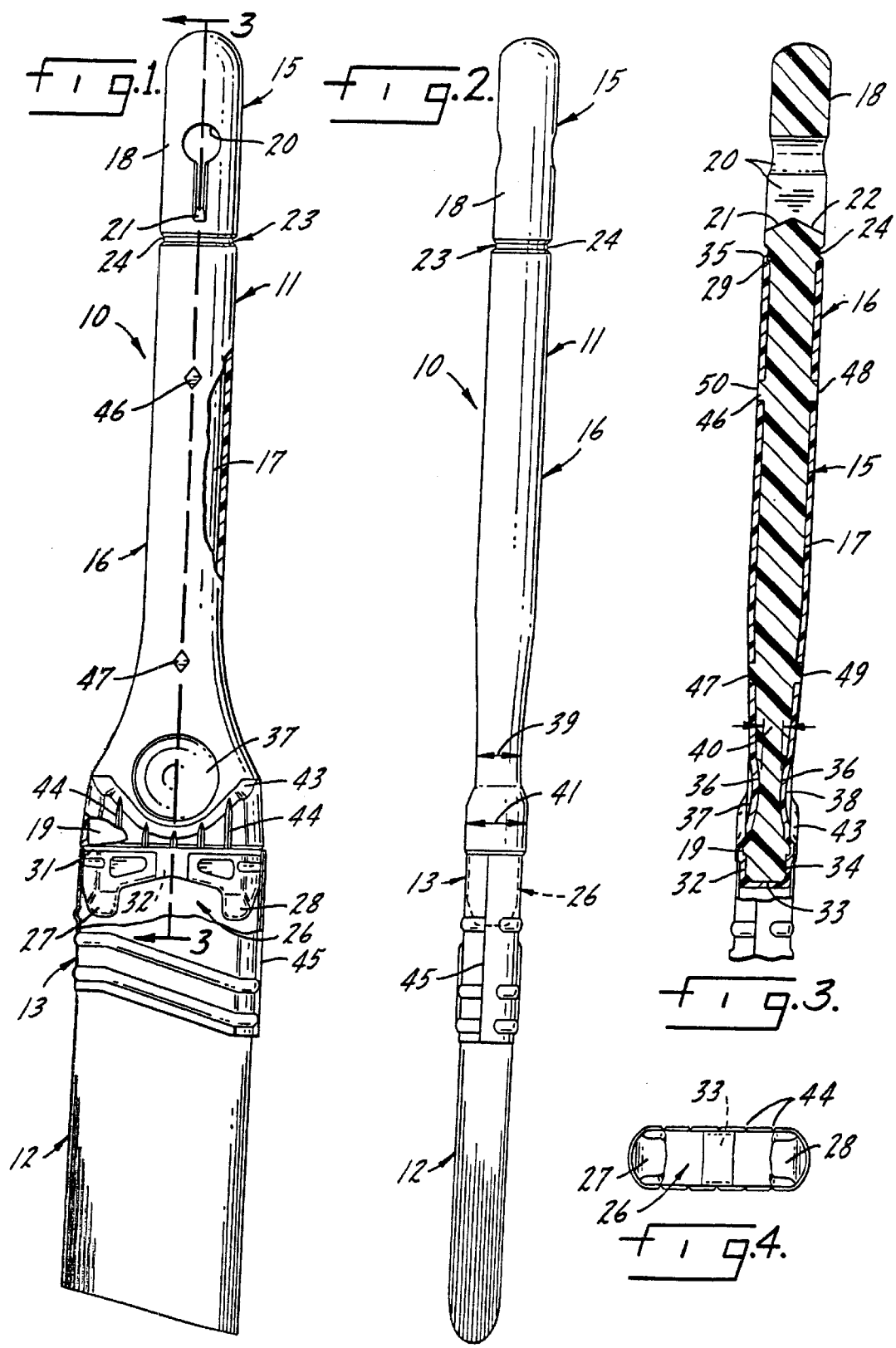

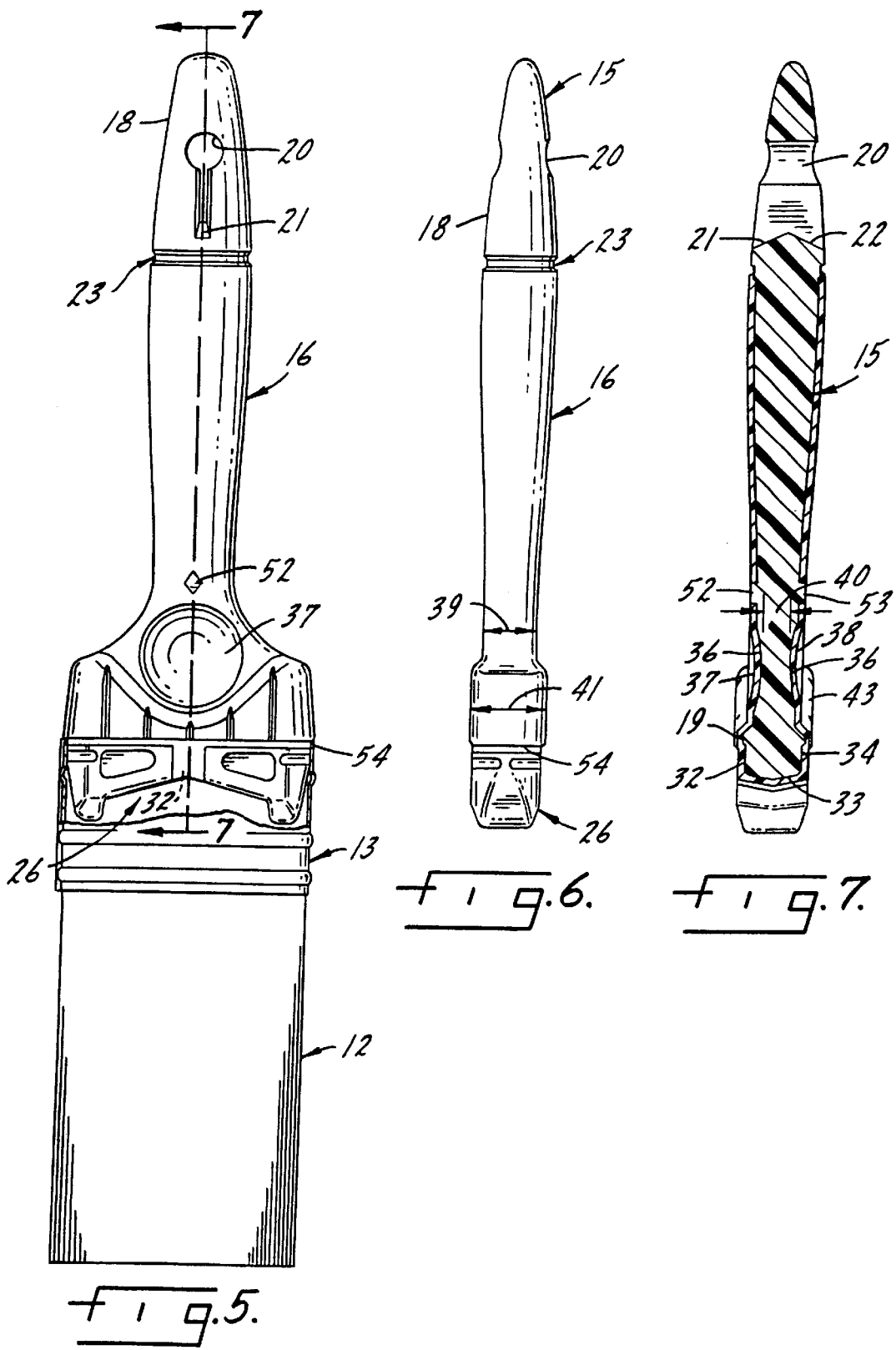

PAINT BRUSH WITH IMPROVED GRIP CONSTRUCTION

CROSS REFERENCE TO RELATED APPLICATIONS

The present application is a continuation application and claims priority under 35 U.S.C. §120 from U.S. patent application Ser. No. 08/841,271, filed Apr. 29, 1994, U.S. Pat. No. 6,138,313, which is in turn a continuation of U.S. patent application Ser. No. 08/513,273, filed Aug. 10, 1995 (abandoned), the full disclosures of which, in their entirety, are hereby incorporated by reference.

FIELD OF THE INVENTION

This invention relates generally to paint applicators, and specifically to paint brush handles, paint brushes and methods of manufacture thereof which result in a handle, and a paint brush, having an improved grip construction and other operational and manufacturing advantages.

BACKGROUND OF THE INVENTION

Currently available paint brushes are usually made with a rigid handle, often wood, but also plastic, to which a series of natural and/or synthetically formed brush filaments are secured, usually with a ferrule at the brush filament-handle junction area, using adhesives, fasteners, such as nails, crimping, or other means. Such brushes are extensively used by do-it-yourself painters who paint on an occasional basis as contrasted to a professional painter or decorator who paints day in and day out. The do-it-yourself painter is thus unaccustomed to the use of hand, wrist and forearm muscles that are called into play in painting with the result that painting becomes a difficult, and sometimes painful, task for such an occasional painter. The same difficulties may not be so pronounced with professional painters but they still are a factor, particularly near the end of a day of painting.

Brush makers have long been cognizant of this problem and attempts have been made to overcome it. The most common approach is to manufacture the brush handle in the form that experience tends to indicate is the most suitable for the specific use for which the brush is intended. Thus, for sash work a long straight handle has been preferred. For general painting purposes a semi-beaver tail contour has been widely used, and for large, wide surfaces, such as exterior siding, a full beaver tail contour has been preferred. Although these shapes do result in a rough match between the applicator and the painting task when such factors as flow and rate of spreadability are considered, nearly all styles include a handle made of a relatively hard, rigid material, such as varnished wood or hard plastic, and hence the problem of hand and forearm fatigue remains a significant drawback. Although attempts have been made to provide a brush having a less taxing operational characteristic, no system which is applicable to all handle contours and which combines sureness of grip, gentleness of contact with the user's hand and ease of use (in the sense of decreasing hand, wrist and forearm pain and stiffness in lengthy painting tasks) has come into widespread use.

Another general problem common to many if not the great majority of brushes currently in use is the degradation of the brush during use with consequent deleterious effects on both the brush, the user and the painting surface. For example, in many if not the great majority of current brushes the ferrule at the brush filament-handle junction area works loose and paint can enter the opened areas and solidify. And in use, water, solvent, or paint, or combinations thereof, which have entered the opened spaces, are able to re-emerge and run down the handle toward the user's hand, thus making a mess and possibly dripping an unwanted color onto a freshly painted surface.

A further annoying and dangerous problem occurs when portions of the end of the ferrule nearest the handle are dislodged from their normal lay-flat position, thus presenting an exposed sharp edge. This is particularly serious when the terminal exposed edge with its associated sharp upper corner is displaced away from a snug fitting relationship with the upper end of the brush filaments and/or the lower, concealed end of the brush handle. Such an exposed edge or sharp corner can easily cut the flesh of the user when in sliding contact with the user's hand.

And finally, it is well known that no system for providing the above described desirable attributes and avoiding the above described drawbacks which is adaptable to the mass production of brushes has been proposed, let alone entered the marketplace.

SUMMARY OF THE INVENTION

The invention is a paint brush, including a handle, and a handle per se, together with a method of manufacturing same, which results in a product which significantly reduces fatigue of the user during use, provides a sure grip with consequent excellent control over the head of the brush filaments during paint application, is applicable to brushes of all specialized uses and handle contours from sash to siding, and feels comfortable in the hand of the user, yet which can be produced at a very modest cost so that mass produced brushes may enjoy the aforesaid significant advantages. Said advantages result from the provision of a thin layer of material having the characteristics with respect to compressibility and flexibility of rubber-like material or soft plastic which is preferably formed as an independent molded product about a hard handle core. Preferably the thin layer is a thermoplastic elastomer and the core is a material compatible with the exterior layer in the sense that a good chemical and/or heat bond as well as a mechanical connection is formed between the thin resilient layer and the hard core. The handle is formed in a two stage injection process in which the core member formed in the first stage includes spacer means which fix the position of the core member in a subsequent molding cavity so that, upon injection of the resilient layer under the necessarily high injection pressures required in such operations to form the thin layer of resilient material, the core will remain perfectly spaced from the surface of the second mold cavity whereby the desired thickness is provided at all locations. The invention further includes application of the resilient layer at the junction area of the ferrule with the handle in such fashion that problems resulting from separation of the ferrule from the balance of the brush are eliminated during normal use to which the brush will be subjected.

Other objects and advantages of the invention will become apparent from the following description of the invention.

BRIEF DESCRIPTION OF THE DRAWINGS

The invention is illustrated more or less diagrammatically in the accompanying drawings wherein:

FIG. 1 is a top plan view of a brush, here a sash brush having a straight handle, with parts broken away for clarity;

FIG. 2 is a right side view of the brush of FIG. 1;

FIG. 3 is a section taken substantially along the line 3—3 of FIG. 1;

FIG. 4 is a front end view of a brush handle of the invention, the ferrule and brush filaments having been omitted;

FIG. 5 is a top plan of an alternative form of a brush, here a semi-beaver tail general purpose brush, with a portion of the ferrule broken away for clarity;

FIG. 6 is a right side view of a handle assembly of the brush of FIG. 5; and

FIG. 7 is a section taken substantially along the line 7—7 of FIG. 5.

DETAILED DESCRIPTION OF THE INVENTION

Like reference numerals will be referenced to like parts from Figure to Figure in the description of the drawing.

Referring first to FIG. 1, a brush, here a sash brush, is indicated generally at 10. The brush 10 includes a handle, indicated generally at 11, a brush head, indicated generally at 12, at the distal end of the handle, and a means for securing the brush head to the handle in operative relationship, here a ferrule, indicated generally at 13.

The handle 11 includes a core, indicated generally at 15, see FIG. 3 particularly, and a thin covering layer, indicated generally at 16, said covering layer having the characteristics, with respect to compressibility and resiliency, of rubber-like material or soft plastic. The core 15 is formed from a relatively hard material, preferably plastic, which provides strength and stiffness to the brush. The core includes a shank portion 17 which terminates at its upper end in hang portion 18 at the proximate end of the handle and, at its lower end, in a width expanded connecting portion 19. Hang portion 18 has, in this instance, a key hole shaped hang slot 20, the bottom of which is formed with inclined surfaces 21, 22, see FIG. 3, which form an apex at the center for easily assembly to a hang structure, such as a peg board hook or extended wire or Q-bic blade. The hang portion 18 is set off from shank portion 17 by a circular channel indicated generally at 23, the bottom 24 of the channel 23 extending outwardly from the central axis of the handle a slightly greater distance than the upper end of the shank portion 17 of the handle for a purpose which will appear hereafter.

The lower expanded portion 19 of the handle terminates in a plug-in section of the ferrule cavity indicated generally at 26 which is received at the upper end of ferrule 13 in a conventional manner, the plug section including side prongs 27, 28.

The covering 16 is composed of a material having the characteristics with respect to compressibility, resiliency and flexibility of rubber-like material or soft plastic. As best seen in FIGS. 1 and 3 the covering 16 extends from the channel 23 downwardly over all the exposed surface area of the shank portion 17 and expanded portion 19 of the core, with one exception to be described hereafter, above the top of ferrule 13. It will be noted from FIG. 1 that, in addition, the covering extends in a narrow band 31 along the upper end of the plug section 26 of the core, the narrow band 31 being located within the upper edge portion of the ferrule. It will be seen from FIG. 1 particularly that the width of the band 31 is slightly shorter than the width of the covering 16 at the lowest point of the expanded portion 19 of the core. Since the width dimension of the lower end of the covering on the expanded portion 19 of the core 15 is equal to or, preferably, slighter greater than the thickness of the ferrule 13, the joining surfaces of the covering 16 and the narrow band 31 form a recess having a depth, in a width direction, at least as great as the thickness of the ferrule. Thus the narrow band 31 and the adjacent shoulder on the covering form a seal with the upper end of the ferrule, which seal precludes entry of fluids into the interior of the ferrule, or the leakage of paint or other applied coating, upwardly over the upper edge of the ferrule from its interior.

The covering 16 extends downwardly in a suitable recess in the center of the core as at 32, loops under the bottom center of the core at 33, see FIG. 3, and extends upwardly, as at 34, in a suitable recess on the bottom side of the core, see FIG. 3, to form a loop connector between the covering on the top and bottom sides of the core which mechanically precludes separation of the covering from the core.

The upper edge of the covering 16, indicated at 35, partially abuts against a shoulder 29 formed just below channel 23 whereby slippage of the covering 16 toward the hang portion 18 is resisted.

A finger grip indentation is formed in the lower end of the handle in the junction area between the shank portion 17 and the expanded portion 19 of the core on both sides of the handle as best seen in FIG. 3. Concave areas 37, 38, of covering 16 follow the contour of the finger grips 36 so that the user may place his thumb and forefinger into the two finger grips 37, 38 during use. This placement of the finger grips 37, 38 in the illustrated very close juxtaposition with the bottom of the handle and top of the ferrule provides near-maximum control of the brush head 12 by the user during coating application. The locations of the finger grips further ease the muscle strains which manipulation of a paint brush entails in that the grips provide a more natural, less stressful position for the hand to occupy during manipulation of the brush head 12 during coating; i.e.: as contrasted to the conventional wider spacing usually found on current brushes. By reference to a straight cylinder handle as the most disadvantageous grip construction, it will be appreciated that the herein disclosed configuration consisting of, firstly, a barrel section to accommodate the wrap of the last three fingers of the user's hand, in conjunction with, secondly, the finger grips 37, 38, provide the most natural and therefore the least tiring hand gripping configuration.

From FIGS. 2 and 3 it will be noted that the thickness 39 of the junction area between the shank portion 17 and the expanded portion 19 of the core is less than the thickness of the bottom portion 19 of the core. By providing a thickness 40 between the finger grips 37, 38, which is only thick enough to provide the minimum required rigidity and structural integrity to the brush, brush filament control is enhanced because of the relatively small distance between the thumb and forefinger of the user in operation as contrasted to the spacing between the thumb and forefinger in a conventional brush handle. It will be appreciated that the closer the two digits of the human hand are placed during a manipulating movement of the hand, the finer the degree of control the user has over the gripped object. The crescent shaped inclined surface 43 on the lower portion of the handle functions as an aesthetically pleasing transition section between the narrow dimension represented by the thickness 39 in the finger grip area and the substantially greater dimension 41 in the ferrule-handle joinder area. Other configurations, including a sharp right angle, could be used however. A plurality of grooves are indicated at 44 in the cover 16. The grooves 44 provide a thumb rest for the user in the event the user finds it more comfortable during use to place his thumb on the bottom portion 19 of the handle than in a finger grip 37, 38. The grooves also function as a means for preventing slippage of the user's thumb, or other finger, which may rest thereon in preference to one of the grips 37, 38. Said grooves are aesthetically pleasing to the eye but, from a functional standpoint, they could be replaced by numerous other constructions, including dimpled depressions or a knurled configuration.

The ferrule 13 is of conventional construction and is applied in conventional fashion to the lower end of the handle, the exposed vertical edge of the ferrule being indicated at 45. In this instance the ferrule has been secured by crimping to the brush head 12 and handle 11, though nails could be used.

A particularly unique feature of the invention is illustrated in FIGS. 1 and 3 by the core projections 46, 47, 48 and 49. As best seen in FIG. 3, projections 48 and 49 extend outwardly to the plane of the surface of cover layer 16. The projections are preferably formed integrally with the core 15 during the core molding operation. The projections are here shown as diamond shaped, see FIG. 1, but it will be appreciated that virtually any contour is feasible, including a circle. The protrusions greatly facilitate the manufacturing process in that they make possible the production of a uniform product at a high rate of speed, and thus make the invention available at a price which the mass market consumer can afford. The protrusions, here diamond shaped, also function as a further mechanical interlock between the core 15 and the covering layer 16 to thereby prevent slippage between the core 15 and the cover layer 16.

Specifically, after molding the core, including the projections 46–49, the thus formed core is placed in a second mold cavity and the cover layer 16 injection molded about the core 15. In view of the thinness of the cover layer 16 and the long distance the hot injection material must flow, and the resultant requisite high pressures encountered during the cover molding step, the core 15 must be braced away from the surface of the mold cavity to ensure that the cover layer material envelopes the core to the desired thickness at all locations. The projection 46–49 serve to locate the core 15 at the desired position within the second molding cavity, the projections thereby functioning in effect as spacers to maintain the core in a precise, predetermined position with respect to the second molding cavity. The projections are here configured so that the surfaces thereof, as indicated at 50, see FIG. 3, abut the wall of the second molding cavity so that injected material may flow around the projections as indicated in FIGS. 1 and 3 but not between the surfaces of the projections and the surface of the mold cavity. As a consequence the surfaces of the projections are flush with the surface of cover layer 16 and provide an eye-pleasing, decorative appearance.

Referring now to the embodiment of FIGS. 5–7 it will be seen that a general purpose semi-beaver tail varnish or wall brush is there illustrated. Similar reference numerals have been used to refer to parts which are the same as or similar to the corresponding parts illustrated in FIGS. 1–4.

In this instance only a single pair of protrusions 52, 53, have been used for the reason that the core is sufficiently short that it may be maintained spaced from the wall of the second cavity with only said pair of protrusions.

In this instance also the lower edge of the exposed portion of cover 16 in its final condition projects outwardly beyond the thickness of the ferrule 13 a significant amount, as indicated in 54. Thus even if the ferrule should work loose slightly at its upper edge, said upper edge will still be within, or aligned with, the exterior dimension of the cover 16 and thus the risk of injury to the user, or the ingress or egress of paint, solvent or other liquid between the cover 16 and the ferrule 13 will be decreased over the structure illustrated in FIGS. 1–4.

The thickness of the soft grip covering 16 will vary from a thickness of on the order of from about 0.030 inches to about 0.125 inches. Below 0.030 inches it will be difficult to push the material over the length of the core 15 through such a small space. If the cover material is thicker than about 0.125 inches the flow will be excellent, but the final structure may be too flexible for easy use, and the cost would increase considerably since the cover material is more costly than the material from which core 15 is made. More preferably, the thickness of the cover material 16 should be on the order of from about 0.050 inches to about 0.075 inches.

The core material is preferably polypropylene. The preferred over-grip or cover grip material is a thermoplastic elastomer (TPE). An example would be Santoprene, which is a polypropylene based TPE with vulcanized rubber dispersed in it. Since both materials are polypropylene based, there will be a better chemical and/or heat bond between both substrates than there would be with dissimilar materials. It will be understood that a bond may be formed by heat fusion or chemical reaction or both heat fusion and chemical reaction depending on the specific materials, times, temperatures and pressures utilized. Most preferably the cover 16 is secured to core 15 not only by the mechanical interlocks but also, to some degree, by a bond provided by heat and/or chemical means.

Other materials could be used for the core material, such as a polyethylene with the Santoprene TPE over-grip. Both materials are in the polyolefin family and would bond and work, but probably not as well as the same material based components. Other base materials such as blends of polypropylene and polyethylene could also be used.

Still other material combinations could be used. For example, Krayton is a styrene based TPE which could be used. It would not be as effective as Santoprene since the base material is styrene which does not have nearly as good solvent resistance to paint solvents as does Santoprene. It would be acceptable for latex or water based systems but not solvent based coatings. Polyvinylchloride (PVC) can also be used but like Krayton the PVC has limited resistance to non-water based solvents. A number of other core and over-grip materials could be used to make this type of brush handle but the materials described above both have a relatively high resistance to all paint solvents and a low manufacturing cost for an integrally molded handle.

As mentioned, the foregoing description pertains to a two-shot molded handle. Other handle designs could also be used such as sliding a premolded sleeve of a grip material over a core handle. A TPE, PVC, polyester or urethane foam or even a rubber material could be slid over a core handle. This slide on could be similar to a bicycle handgrip or it could be mechanically trapped in a recess but significant disadvantages to said alternative processes exist to the point where the illustrated and described construction is much preferred.

Although a preferred embodiment of the invention has been illustrated and described in the foregoing specification, it will at once be apparent to those skilled in the art that the modifications and improvements may be made. Accordingly it is intended that the scope of the invention be defined by the scope of the hereafter appended claims when interpreted in light of the relevant prior art, and not by the scope of the foregoing exemplary description.

What is claimed is:

1. A paint applicator, said paint applicator comprising:
a handle having a major longitudinal length, a proximal end, a distal end, a shank portion and a non-round expanded portion having a distal end and joined to the shank portion by a junction area therebetween, the expanded portion having a front face, a rear face and first and second sides between the front face and the rear face, the first and second sides extending substantially parallel to one another, the expanded portion including:
a thumb and finger control means located closely adjacent the distal end of the non-round expanded portion of the handle,
said control means including a first exterior depression on the front face, at least partially extending between the first and second sides and bounded at least in part by a first arcuate periphery having a concave side facing the proximal end of the handle, wherein the first depression is of a size large enough to comfortably receive the thumb or a finger, whereby the first arcuate periphery contacts the thumb or finger to retain the thumb or finger in place; and
a paint carrying and applying medium proximate the distal end of the handle and longitudinally extending away from the distal end of the handle.

2. The paint applicator of claim 1 wherein the first depression is continuously bounded by the first arcuate periphery.

3. The paint applicator of claim 1 wherein the control means includes a second depression on the rear face, the depression being bounded at least in part by a second arcuate periphery, wherein the second depression is of a size large enough to comfortably receive the thumb or a finger of a user during use, whereby the second arcuate periphery contacts the thumb or finger to retain the thumb or finger in place.

4. The paint applicator of claim 3 wherein the first exterior depression and the second exterior depression are equidistantly located between the first and second sides.

5. The paint applicator of claim 3 wherein the shank portion extends along an axis and wherein the first and second exterior depressions are located along the axis.

6. The brush of claim 1 including a crescent-shaped inclined surface in the expanded portion at least partially surrounding the first depression.

7. The paint applicator of claim 1 wherein the handle is formed from a rigid core and an elastomeric layer of gripping material at least partially overlying the core, wherein the first depression is formed in an exterior surface of the layer of gripping material.

8. The paint applicator of claim 7 wherein the layer of gripping material has a thickness of at least about 0.030 inches.

9. The paint applicator of claim 7 wherein the layer of gripping material has a thickness of between about 0.030 inches and about 0.125 inches.

10. The paint applicator of claim 7 wherein the layer of gripping material has a thickness of at least about 0.050 inches.

11. The paint applicator of claim 7 wherein the layer of gripping material has a thickness of between about 0.050 inches and about 0.075 inches.

12. The paint applicator of claim 7 wherein the core includes a first interior depression underlying the first exterior depression formed in the exterior surface of the gripping material.

13. The paint applicator of claim 7 wherein the layer of gripping material has a substantially uniform thickness.

14. The paint applicator of claim 7 wherein the core is formed from at least one polymeric material.

15. The paint applicator of claim 7 wherein the layer of gripping material is a solvent resistant thermoplastic.

16. The paint applicator of claim 7 wherein the layer of gripping material is a thermoplastic elastomer.

17. The paint applicator of claim 7 wherein the handle includes a second exterior depression and wherein the second exterior depression is formed in an exterior surface of the layer of gripping material.

18. The paint applicator of claim 17 wherein the layer of gripping material continuously extends between the first and second exterior depressions.

19. The paint applicator of claim 17 wherein the core includes a second interior depression underlying the second exterior depression formed in the exterior surface of the gripping material.

20. The paint applicator of claim 17 wherein the first exterior depression and the second depression are equidistantly located between the first and second sides.

21. The paint applicator of claim 17 wherein the shank portion extends along an axis and wherein the first and second exterior depressions are located along the axis.

22. The paint applicator of claim 7 wherein the layer of gripping material encapsulates the core at the distal end of the non-round expanded portion.

23. The paint applicator of claim 22, including a ferrule joined to the handle and extending about the paint carrying and applying medium.

24. The paint applicator of claim 7 wherein the core and the layer of gripping material are each formed from a polyolefin polymer.

25. The paint applicator of claim 7 wherein the core and the layer of gripping material are both polypropylene based.

26. The paint applicator of claim 1, including a ferrule joined to the handle and extending about the paint carrying and applying medium.

27. A paint brush comprising:
a handle having a proximal end, a distal end, a shank portion and a non-round expanded portion;
a plurality of brush filaments extending along parallel axes and formed into a group of bristles;
a ferrule coupling the bristles to the distal end of the brush handle, the ferrule having a length extending substantially perpendicular to the axes of the brush filaments;
a thumb and finger control means located closely adjacent the distal end of the handle in the non-round expanded portion,
said control means including an arcuate inclined surface having a concave side facing the proximal end, the arcuate inclined surface being located closely adjacent the distal end of non-round expanded portion, wherein the inclined surface is of a size large enough to partially surround the thumb or a finger of a user to retain the thumb or finger in place during use.

28. The paint brush of claim 27 wherein the control means further includes a depression, the depression bound at least in part by an arcuate periphery, wherein the depression is of a size large enough to comfortably receive the thumb or a finger of a user during use, whereby the arcuate periphery contacts the thumb or finger to retain the thumb or finger in place.

29. The paint brush of claim 28 wherein the arcuate periphery substantially surrounds the depression.

30. The paint brush of claim 28 wherein the depression is located between the arcuate inclined surface and the proximal end of the handle.

31. The paint brush of claim 27 wherein the non-round expanded portion has a proximal end, a distal end proximate the bristles and a midpoint, and wherein the arcuate inclined surface is between the midpoint and the distal end of the non-rounded expanded portion.

32. The paint brush of claim 27 wherein the shank portion extends along an axis and wherein the arcuate inclined surface extends across the axis.

33. The paint brush of claim 27 wherein the handle is formed from a rigid core and an elastomeric layer of gripping material at least partially overlapping the core.

34. The paint brush of claim 33 wherein the core is formed from at least one polymeric material.

35. The paint brush of claim 33 wherein the layer of gripping material is a thermoplastic elastomer.

36. The paint brush of claim 33 wherein the handle includes a first exterior depression formed in an exterior surface of the layer of gripping material and a second exterior depression opposite the first exterior depression and formed in an exterior surface of the layer of gripping material.

37. The paint brush of claim 36 wherein the layer of gripping material continuously extends between the first exterior depression and the second exterior depression.

38. The paint brush of claim 33 wherein the layer of gripping material has a thickness of at least about 0.030 inches.

39. The paint brush of claim 33 wherein the layer of gripping material has a thickness of at least about 0.050 inches.

40. The paint brush of claim 33 wherein the layer of gripping material has a thickness of between about 0.030 inches and about 0.125 inches.

41. The paint brush of claim 33 wherein the layer of gripping material has a thickness of between about 0.050 inches and about 0.075 inches.

42. A brush comprising:
a handle having a proximal end and a distal end, the handle including:
a rigid core; and
a layer of solvent resistant gripping material overlying at least a substantial portion of the core, the layer of gripping material being formed of a compressible material and having a sufficient thickness so as to be compressible wherein the layer of gripping material has a thickness of at least about 0.030 inches; and
a brush head coupled to the handle and including:
a plurality of brush filaments formed into a self-sustaining group of bristles; and
a ferrule extending about the self-sustaining group of bristles and extending adjacent to the distal end of the brush handle, wherein the layer of gripping material is disposed between the core and the ferrule and wherein the ferrule is compressed against the layer of gripping material proximate to the distal end of the brush handle to form a seal between the ferrule and the distal end of the brush handle.

43. The brush of claim 42 wherein the layer of gripping material proximate the distal end of the handle forms a band and a shoulder above the band and wherein the ferrule is compressed against the band and the shoulder to form the seal.

44. The brush of claim 42 including thumb and finger control means located closely adjacent the distal end of the handle, said control means including a first depression bound at least in part by a first arcuate periphery, wherein the first depression is of a size large enough to comfortably receive the thumb or a finger of a user during use, said layer of gripping material extending into the first depression.

45. The brush of claim 44 wherein the control means includes a second depression on an opposite side of the handle, the second depression bound at least in part by a second arcuate periphery, wherein the second depression is of a size large enough to comfortably receive the thumb or a finger of a user during use, whereby the second arcuate periphery contacts the thumb or finger to retain the thumb or finger in place.

46. The brush of claim 45 including a first arcuate inclined surface extending between the first depression and the ferrule.

47. The brush of claim 46 wherein the first arcuate inclined surface has a concave side facing the proximal end.

48. The brush of claim 46 wherein the layer of gripping material extends over the first arcuate inclined surface.

49. The brush of claim 46 including a second arcuate inclined surface on an opposite side of the handle between the second depression and the ferrule.

50. The brush of claim 42 further characterized in that the core and gripping material are at least partially bonded to one another.

51. The brush of claim 42 wherein the handle includes a shank portion and a non-round expanded portion adjacent the ferrule.

52. The brush of claim 51 wherein the non-round expanded portion has a generally axial rectangular cross section.

53. The brush of claim 51 wherein the shank portion has a first width and wherein the self-sustaining group of bristles has a second greater width that is substantially equal to a width of the ferrule.

54. The brush of claim 42 wherein the layer of gripping material has a thickness of between about 0.030 inches and about 0.125 inches.

55. The brush of claim 42 wherein the layer of gripping material has a thickness of at least about 0.050 inches.

56. The brush of claim 42 wherein the layer of gripping material has a thickness of between about 0.050 inches and about 0.075 inches.

57. The brush of claim 42 wherein the layer of gripping material encapsulates the rigid core at the distal end of the handle.

58. The brush of claim 42 wherein the rigid core and the layer of gripping material are each formed from a polyolefin polymer.

59. The brush of claim 58 wherein the core and the layer of gripping material are both polypropylene based.

60. A paint brush comprising:
a handle having a proximal end a distal end, a shank portion and a non-round expanded portion coupled to the shank portion, the expanded portion having a front face, a rear face, and first and second sides between the front face and the rear face, the expanded portion being generally formed of a rigid inelastic polymeric material, the expanded portion forming a first underlying depression in the front face and a second underlying depression opposite the first underlying depression in the rear face;
an elastomeric cover layer overlying the inelastic material of the expanded portion in at least the first and second underlying depressions of the expanded portion, wherein the cover layer at least partially forms first and second outer depressions in the front face and the rear face, respectively, wherein the elastomeric cover layer encapsulates the inelastic polymeric material at the distal end of the handle;

a plurality of brush filaments extending along parallel axes and formed into a group of bristles; and a ferrule coupling the bristles to the distal end of the handle.

61. The paint brush of claim 60 wherein the first and second sides extend substantially parallel to one another and wherein the first outer depression and the second outer depression each at least partially extend between the first and second sides.

62. The paint brush of claim 60 wherein the first outer depression and the second outer depression are each bound at least in part by an arcuate periphery adjacent the distal end of the handle and having a concave side facing the proximal end of the handle.

63. The paint brush of claim 62 wherein the first outer depression and the second outer depression are each continuously bounded by the arcuate periphery.

64. The paint brush of claim 60 wherein the shank portion and the non-round expanded portion are joined by a junction area terminating at a shoulder adjacent the non-round expanded portion.

65. The paint brush of claim 60 including a first crescent-shaped inclined surface on the expanded portion at least partially surrounding the first outer depression.

66. The paint brush of claim 65 including a second crescent-shaped inclined surface on the expanded portion at least partially surrounding the second outer depression.

67. The paint brush of claim 60 wherein the handle has a thickness and wherein the thickness is smallest between the first outer depression and the second outer depression.

68. The paint brush of claim 60 wherein the elastomeric cover layer continuously extends between the first and second underlying depressions.

69. The paint brush of claim 60 wherein the elastomeric cover layer has a thickness of at least about 0.030 inches.

70. The paint brush handle of claim 60 wherein the elastomeric cover layer has a thickness of between about 0.030 inches and about 0.125 inches.

71. The paint brush of claim 60 wherein the elastomeric cover layer has a thickness of at least about 0.050 inches.

72. The paint brush of claim 60 wherein the elastomeric cover layer has a thickness of between about 0.050 inches and about 0.075 inches.

73. A paint brush comprising:

a handle having a proximal end, a distal end, a shank portion and a non-round expanded portion coupled to the shank portion, the expanded portion having a front face, a rear face, and first and second sides between the front face and the rear face, the expanded portion being generally formed of a rigid inelastic polymeric material, the expanded portion forming a first underlying depression in the front face and a second underlying depression opposite the first underlying depression in the rear face;

an elastomeric cover layer overlying the inelastic material of the expanded portion in at least the first and second underlying depressions of the expanded portion, wherein the cover layer at least partially forms first and second outer depressions in the front face and the rear face, respectively, wherein the elastomeric layer of gripping material continuously extends between the first and second outer depressions;

a plurality of brush filaments extending along parallel axes and formed into a group of bristles; and a ferrule coupling the bristles to the distal end of the handle.

74. A paint brush comprising:

a handle having a proximal end, a distal end, a shank portion and a non-round expanded portion coupled to the shank portion, the expanded portion having a front face, a rear face, and first and second sides between the front face and the rear face, the expanded portion being generally formed of a rigid inelastic material, the expanded portion forming a first underlying depression in the front face and a second underlying depression opposite the first underlying depression in the rear face;

an elastomeric cover layer overlying the inelastic material of the expanded portion in at least the first and second underlying depressions of the expanded portion, wherein the cover layer at least partially forms first and second outer depressions in the front face and the rear face, respectively, wherein the first outer depression and the second outer depression are each continuously bounded by an arcuate periphery having a concave side facing the proximal end of the handle;

a plurality of brush filaments extending along parallel axes and formed into a group of bristles; and a ferrule coupling the bristles to the distal end of the handle.

* * * * *